(12) United States Patent
Park et al.

(10) Patent No.: US 9,599,864 B2
(45) Date of Patent: Mar. 21, 2017

(54) LIQUID CRYSTAL DISPLAY DEVICE

(71) Applicant: Samsung Display Co., Ltd., Yongin, Gyeonggi-Do (KR)

(72) Inventors: Jaehong Park, Yongin (KR); Sungjae Yun, Yongin (KR); Kichul Shin, Yongin (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 84 days.

(21) Appl. No.: 14/642,351

(22) Filed: Mar. 9, 2015

(65) Prior Publication Data
US 2016/0041435 A1 Feb. 11, 2016

(30) Foreign Application Priority Data
Aug. 6, 2014 (KR) ........................ 10-2014-0101098

(51) Int. Cl.
*G02F 1/1347* (2006.01)
*G02F 1/1343* (2006.01)
*G02F 1/137* (2006.01)

(52) U.S. Cl.
CPC ...... *G02F 1/134309* (2013.01); *G02F 1/1347* (2013.01); *G02F 2001/13712* (2013.01)

(58) Field of Classification Search
CPC .. G02F 1/137; G02F 1/134309; G02F 1/1347; G02F 2001/13712

USPC .......................................................... 349/74
See application file for complete search history.

(56) References Cited

U.S. PATENT DOCUMENTS

| | | | | |
|---|---|---|---|---|
| 5,625,474 A | * | 4/1997 | Aomori | G02F 1/1347 349/139 |
| 5,986,729 A | * | 11/1999 | Yamanaka | G02F 1/1333 349/153 |
| 6,094,244 A | * | 7/2000 | Kawata | G02F 1/1347 349/74 |
| 6,512,559 B1 | * | 1/2003 | Hashimoto | G02F 1/13475 349/74 |
| 2007/0109466 A1 | | 5/2007 | Choi et al. | |
| 2007/0242028 A1 | | 10/2007 | Kitagawa et al. | |
| 2008/0123025 A1 | * | 5/2008 | Li | G02F 1/13471 349/74 |
| 2010/0007833 A1 | | 1/2010 | Kuo et al. | |
| 2011/0075070 A1 | | 3/2011 | Kitagawa et al. | |

FOREIGN PATENT DOCUMENTS

| | | |
|---|---|---|
| JP | 2004-045984 | 2/2004 |
| KR | 10-2007-0050741 | 5/2007 |

* cited by examiner

*Primary Examiner* — Hoan C Nguyen
(74) *Attorney, Agent, or Firm* — Robert E. Bushnell, Esq.

(57) ABSTRACT

Provided is a liquid crystal display device. The liquid crystal display device includes: a first substrate and a second substrate; a liquid crystal layer between the first and second substrates; a first electrode and a second electrode formed on inner sides of the first and second substrates, respectively; and at least one third electrode formed in the liquid crystal layer to divide the liquid crystal layer into a plurality of sub-liquid crystal layers in a cell gap direction.

13 Claims, 5 Drawing Sheets

LIQUID CRYSTAL DISPLAY DEVICE

CLAIM OF PRIORITY

This application makes reference to, incorporates the same herein, and claims all benefits accruing under 35 U.S.C. §119 from an application earlier filed in the Korean Intellectual Property Office on 6 Aug. 2014 and there duly assigned Serial No. 10-2014-0101098.

BACKGROUND OF THE INVENTION

Field of the Invention

One or more embodiments of the present invention relate to a display device, and more particularly, to a liquid crystal display device.

Description of the Related Art

Display devices are necessary for computer monitors, televisions, cellular phones, portable terminals, etc. Examples of the currently most widely used flat display devices include liquid crystal display devices and organic light-emitting display devices.

Liquid crystal display devices which are one of the currently most widely used flat panel display devices include two flat plates on which pixel and common electrodes are formed, and a liquid crystal layer disposed between the two flat plates. When voltages are applied to the pixel and common electrodes to form an electric field across the liquid crystal layer, the arrangement of liquid crystal molecules of the liquid crystal layer is varied by the electric field, and thus the polarization of light passing through the liquid crystal layer is controlled to display images.

Vertically aligned mode liquid crystal display devices in which major axes of liquid crystal molecules are perpendicular to a display plate when an electric field is not applied thereto have been developed.

A major concern about vertically aligned mode liquid crystal display devices is to guarantee a wide angle of view, and thus cut portions such as fine slits are formed in electrodes for driving pixels. Since the cut portions determine the tilt direction of liquid crystal molecules, the tilt direction of the liquid crystal molecules may be distributed in many directions by properly arranging the cut portions, so as to widen an angle of view. In the case of a liquid crystal display device in which fine slits are formed in an electrode to form a plurality of fine branch electrodes on the electrode and side visibility is guaranteed by applying different voltages to two sub-pixels formed by dividing each pixel, since a switch driving unit occupies a relatively large area in each pixel, the aperture ratio of the liquid crystal display device is low, and thus the transmittance of the liquid crystal display device is low.

In development of high-resolution panels using liquid crystal display devices, the transmittance of the liquid crystal display devices may be a major factor, and thus it may be difficult to use the above-described method of dividing each pixel into two sub-pixels.

In addition, the speed of response of liquid crystal is a major factor when the driving frequency of a liquid crystal display device is increased and the liquid crystal display device is applied to a three-dimensional product. A decrease of a cell gap may be an important factor for improving the speed of response of liquid crystal. However, if a cell gap is simply reduced in an existing structure, a liquid crystal having a high refractive index may have to be used.

The above information disclosed in this Background section is only for enhancement of understanding of the background of the invention and therefore it may contain information that does not form the prior art that is already known in this country to a person of ordinary skill in the art.

SUMMARY OF THE INVENTION

One or more embodiments of the present invention include a liquid crystal display device for improving transmittance and the speed of response of liquid crystal.

Additional aspects will be set forth in part in the description which follows and, in part, will be apparent from the description, or may be learned by practice of the presented embodiments.

According to one or more embodiments of the present invention, a liquid crystal display device includes: a first substrate and a second substrate; a liquid crystal layer between the first and second substrates; a first electrode and a second electrode formed on inner sides of the first and second substrates, respectively; and at least one third electrode formed in the liquid crystal layer to divide the liquid crystal layer into a plurality of sub-liquid crystal layers in a cell gap direction.

The third electrode may be a pixel electrode.

Different effective voltages may be applied to the plurality of sub-liquid crystal layers.

A common voltage may be applied to one of the first and second electrodes, and a particular voltage different from the common voltage may be applied to the other of the first and second electrodes for applying different effective voltages to the plurality of sub-liquid crystal layers.

The particular voltage may be about 2 V or lower.

The pixel electrode may have a one pixel structure.

Fine slits may be formed in the pixel electrode such that the pixel electrode may include a plurality of fine branch electrodes for distributing a tilt direction of liquid crystal molecules in various directions.

The pixel electrode may include: a central cross pattern electrode; and a plurality of fine branch electrodes extending from the cross pattern electrode in diagonal directions.

The plurality of sub-liquid crystal layers may include a first sub-liquid crystal layer and a second sub-liquid crystal layer, and the third electrode may be disposed between the first and second sub-liquid crystal layers.

The liquid crystal layer may be divided into the plurality of sub-liquid crystal layers within a range in which an effective refractive index of the liquid crystal layer is maintained.

The plurality of sub-liquid crystal layers may be formed of the same liquid crystal.

The liquid crystal display device may further include a support member disposed in the liquid crystal layer to support the third electrode.

As described above, according to the one or more of the above embodiments of the present invention, since the liquid crystal layer of the liquid crystal display device is divided into the plurality of sub-liquid crystal layers in the cell gap direction, the speed of response may be increased owing to a decrease in the effective cell gap. In addition, since different effective voltages are applied to the plurality of sub-liquid crystal layers, the polar angle of liquid crystal may be variously distributed for guaranteeing side visibility, and thus each pixel may be formed in a structure having a single pixel region for improving an aperture ratio and obtaining a high degree of transmittance necessary for a high-resolution panel.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
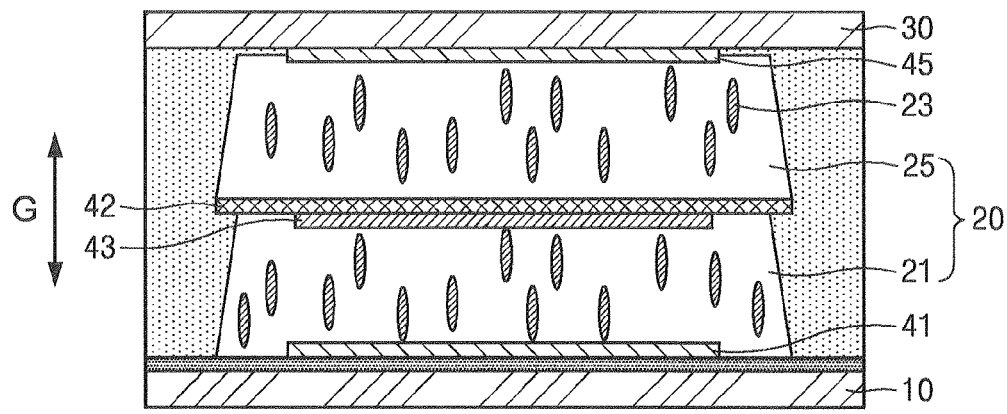
FIG. 1 is a schematic cross-sectional view illustrating a liquid crystal display device according to an embodiment of the present invention.

Reference will now be made in detail to embodiments, examples of which are illustrated in the accompanying drawings. Effects and features of the embodiments, and implementation methods thereof will be clarified through the following descriptions given with reference to the accompanying drawings. In this regard, the embodiments may have different forms and should not be construed as being limited to the descriptions set forth herein. As used herein, the term "and/or" includes any and all combinations of one or more of the associated listed items. Expressions such as "at least one of," when preceding a list of elements, modify the entire list of elements and do not modify the individual elements of the list.

Hereinafter, the embodiments of the present invention will be described in detail with reference to the accompanying drawings. In the drawings, like reference numerals denote like elements, and overlapping descriptions thereof will be omitted.

It will be understood that although the terms "first", "second", etc. may be used herein to describe various components, these components should not be limited by these terms.

These terms are only used to distinguish one component from another.

As used herein, the singular forms "a," "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

It will be further understood that when a layer, region, or component is referred to as being "formed on," another layer, region, or component, it can be directly or indirectly formed on the other layer, region, or component. That is, for example, intervening layers, regions, or components may be present.

Sizes of elements in the drawings may be exaggerated for convenience of explanation. In other words, since sizes and thicknesses of components in the drawings are arbitrarily illustrated for convenience of explanation, the following embodiments are not limited thereto.

FIG. 1 is a schematic cross-sectional view illustrating a liquid crystal display device according to an embodiment of the present invention.

Referring to FIG. 1, the liquid crystal display device of the embodiment of the present invention includes first and second substrates (for example, a lower substrate 10 and an upper substrate 30) and a liquid crystal layer 20 disposed therebetween. A first electrode 41 and a second electrode 45 may be formed on inner sides of the lower substrate 10 and the upper substrate 30, respectively, and at least one third electrode 43 may be disposed in the liquid crystal layer 20 to divide the liquid crystal layer 20 into a plurality of sub-liquid crystal layers 21 and 25. In one embodiment, the entirety of the third electrode 43 may be immersed in the liquid crystal layer 20. In the example shown in FIG. 1, a single third electrode 43 is disposed to divide a cell gap of the liquid crystal layer 20 into two parts, and thus the liquid crystal layer 20 is constituted by a first sub-liquid crystal layer 21 and a second sub-liquid crystal layer 25. In other examples, the cell gap of the liquid crystal layer 20 may be divided into three or more parts to form three or more sub-liquid crystal layers. The following description will be presented under the assumption that the liquid crystal layer 20 is divided into two sub-liquid crystal layers. The first, second and third electrodes are made of electrically conductive material and are electrically isolated from each other.

The lower substrate 10 and the upper substrate 30 may be insulation substrates such as glass or plastic substrates. Alignment layers may be formed on inner surfaces of the lower substrate 10 and the upper substrate 30. For example, the alignment layers may be vertical alignment layers. Polarizers may be disposed on outer surfaces of the lower substrate 10 and the upper substrate 30. In this case, transmission axes of the polarizers may be orthogonal to each other. The liquid crystal display device of the current embodiment of the present invention may be a reflective liquid crystal display device, and in this case, a polarizer may only be disposed on a light exit surface, for example, the outer surface of the upper substrate 30.

Figure 2:
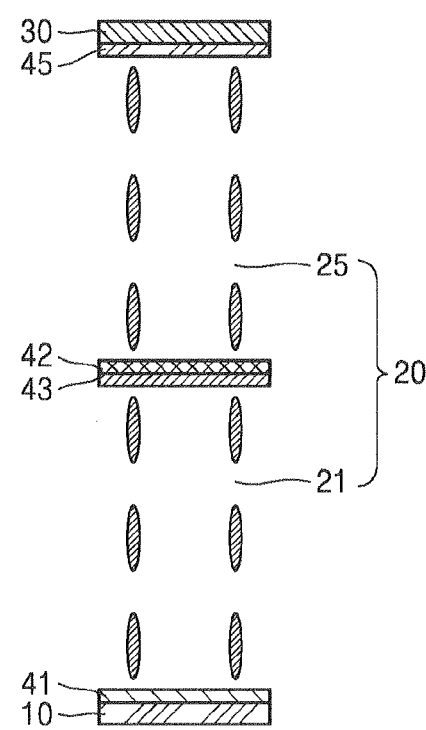
FIG. 2 is an exemplary view illustrating the liquid crystal display device of FIG. 1 when liquid crystal molecules are vertically aligned.

Referring to FIG. 2, when an electric field is not applied to the liquid crystal layer 20, the liquid crystal layer 20 may be in a vertically aligned mode in which major axes of molecules of liquid crystal are perpendicular to the lower substrate 10 and the upper substrate 30. For example, the liquid crystal of the liquid crystal layer 20 may have negative dielectric anisotropy. If two orthogonal polarizers are disposed on the outer surfaces of the lower substrate 10 and the upper substrate 30, light passing through one of the polarizers in a state in which an electric field is not applied to the liquid crystal layer 20 may not pass through the other of the polarizers.

The liquid crystal layer 20 is divided into the plurality of sub-liquid crystal layers 21 and 25 in a cell gap direction G by at least one third electrode 43. In detail, the liquid crystal layer 20 is divided into two or more (a plurality of) sub-liquid crystal layers 21 and 25 within a range in which an effective refractive index in a panel of the liquid crystal display device is maintained. The reason for this is to maintain effective refractive index Δn*d for adjusting transmittance according to the application of an electric field. In the above, Δn denotes a refractive index difference caused by a variation in the alignment of the liquid crystal, and d denotes a total cell gap of the liquid crystal layer 20.

In this case, the plurality of sub-liquid crystal layers 21 and 25 may be formed of the same liquid crystal. If the plurality of sub-liquid crystal layers 21 and 25 are formed of the same liquid crystal, process difficulties may be reduced when compared to the case in which the plurality of sub-liquid crystal layers 21 and 25 are formed of different liquid crystals. However, if necessary, at least a portion of the plurality of sub-liquid crystal layers 21 and 25 may be formed of a different liquid crystal.

If a single third electrode 43 is disposed in the liquid crystal layer 20, the cell gap of the liquid crystal layer 20 may be divided into two parts in the cell gap direction, and the liquid crystal layer 20 may be divided into a first sub-liquid crystal layer 21 and a second sub-liquid crystal layer 25.

Figure 3A:
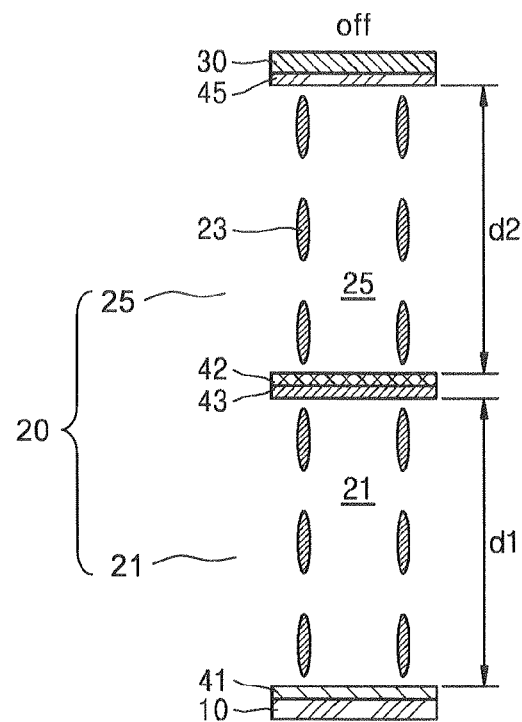
FIGS. 3A and 3B are a view illustrating a liquid crystal alignment state when an electric field is not applied to first and second sub-liquid crystal layers of the liquid crystal display device of the embodiment and a view illustrating a liquid crystal alignment state when an electric field is applied to the first and second sub-liquid crystal layers of the liquid crystal display device of the embodiment, respectively.
Figure 3B:
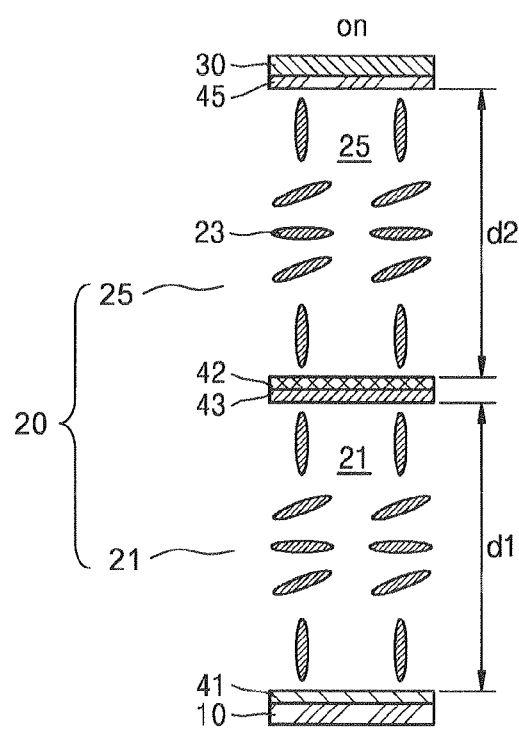

As described above, if a third electrode 43 is disposed in the liquid crystal layer 20 to divide the liquid crystal layer 20 into a plurality of sub-liquid crystal layers 21 and 25 (for example, a first sub-liquid crystal layer 21 and a second sub-liquid crystal layer 25) in the cell gap direction, the alignment of liquid crystal is changed when an electric field is applied. FIGS. 3A and 3B are a view illustrating a liquid crystal alignment state when an electric field is not applied to the first and second sub-liquid crystal layers 21 and 25 of the liquid crystal display device of the embodiment and a view illustrating a liquid crystal alignment state when an electric field is applied to the first and second sub-liquid crystal layers 21 and 25, respectively. In the example shown in FIGS. 3A and 3B, the liquid crystal layer 20 has a property of being vertically aligned, and the cell gap of the liquid crystal layer 20 is divided into two parts to form the first sub-liquid crystal layer 21 and the second sub-liquid crystal layer 25.

In FIGS. 3A and 3B, d1 denotes a cell gap of the first sub-liquid crystal layer 21, and d2 denotes a cell gap of the second sub-liquid crystal layer 25. The total cell gap of the liquid crystal layer 20 corresponds to the sum of the cell gap d1 of the first sub-liquid crystal layer 21 and the cell gap d2 of the second sub-liquid crystal layer 25. When the liquid crystal layer 20 is divided into a plurality of sub-liquid crystal layers such as the first sub-liquid crystal layer 21 and the second sub-liquid crystal layer 25, the cell gap d1 of the first sub-liquid crystal layer 21 and the cell gap d2 of the second sub-liquid crystal layer 25 have effect on the speed of response when the liquid crystal is driven. Therefore, when the liquid crystal layer 20 is divided into the plurality of sub-liquid crystal layers 21 and 25, an effective cell gap having effect on the speed of response of the liquid crystal in operation is smaller than the total cell gap of the liquid crystal layer 20, and thus the speed of response may be markedly increased.

For example, the first electrode 41 provided on the lower substrate 10 may be a common electrode receiving a common voltage. For example, the second electrode 45 provided on the upper substrate 30 may be an electrode receiving a particular voltage. However, alternatively, the first electrode 41 provided on the lower substrate 10 may receive a particular voltage, and the second electrode 45 provided on the upper substrate 30 may be used as a common electrode receiving a common voltage. The following description will be presented under the assumption that the first electrode 41 provided on the lower substrate 10 is a common electrode and the second electrode 45 provided on the upper substrate 30 is an electrode for receiving a particular voltage. However, the embodiments of the present invention are not limited thereto. Furthermore, in the embodiment of the present invention, the lower substrate 10 and the upper substrate 30 are relatively named for illustrative purposes only. That is, according to the perspective of a viewer, the lower substrate 10 and the upper substrate 30 may be considered as being respectively positioned at rear and front sides in addition to being considered as being respectively positioned at lower and upper sides.

In the liquid crystal display device of the embodiment of the present invention, the particular voltage may have a value within a range lower than a pixel voltage for operating pixels. For example, the particular voltage may be about 2 V or lower.

The third electrode 43 is a pixel electrode, and a pixel voltage may be applied to the third electrode 43. For example, the pixel voltage may range from about 0 V to about 8 V. The third electrode 43 may be supported in the liquid crystal layer 20 by a support member 42. As shown in FIG. 1, when a single third electrode 43 is disposed in the liquid crystal layer 20, the liquid crystal layer 20 is divided by the single third electrode 43 into the first sub-liquid crystal layer 21 and the second sub-liquid crystal layer 25. That is, the third electrode 43 is disposed between the first sub-liquid crystal layer 21 and the second sub-liquid crystal layer 25. Alternatively, two or more third electrodes 43 may be disposed to divide the liquid crystal layer 20 into three or more sub-liquid crystal layers. In this case, the same pixel voltage or different pixel voltages may be applied to the two or more third electrodes 43.

As described above, when a common voltage is applied to one of the first and second electrodes 41 and 45 and a particular voltage is applied to the other of the first and second electrodes 41 and 45, different effective voltages are applied to the plurality of sub-liquid crystal layers 21 and 25 due to a difference between the common voltage and the particular voltage.

For example, when the liquid crystal layer 20 is divided into the first and second sub-liquid crystal layers 21 and 25 by the single third electrode 43, effective voltages of the first and second sub-liquid crystal layers 21 and 25 become different due to a common voltage (for example, about 0 V) applied to one of the first and second electrodes 41 and 45 and a particular voltage (for example, about 2 V) applied to the other of the first and second electrodes 41 and 45.

As described above, when at least one single third electrode 43 is disposed in the liquid crystal layer 20 to divide the liquid crystal layer 20 into a plurality of sub-liquid crystal layers 21 and 25 in the cell gap direction, the effective cell gaps of the sub-liquid crystal layers 21 and 25 are smaller than the total cell gap of the liquid crystal layer 20.

Therefore, in the embodiment of the present invention, the speed of response of the liquid crystal display device may be markedly improved because the effective cell gaps of the sub-liquid crystal layers 21 and 25 are small.

As known well, the speed of response is reverse proportional to the square of a cell gap. Therefore, when the cell gap of liquid crystal is reduced to half while maintaining Δn at the same level, the speed of response of the liquid crystal may be improved by substantially a factor of 4. When the number of the plurality of sub-liquid crystal layers 21 and 25 is n, the speed of response may be improved by substantially a factor of $n^2$.

In the embodiment of the present invention, the third electrode 43 which is a pixel electrode may have a one pixel structure for increasing the aperture ratio and transmittance of the liquid crystal display device. In this case, when the liquid crystal layer 20 has a property of being vertically aligned, fine slits may be formed in the third electrode 43 so that the third electrode 43 may have a plurality of fine branch electrodes for obtaining a wide angle of view by varying the slope of liquid crystal in many directions.

Figure 4:
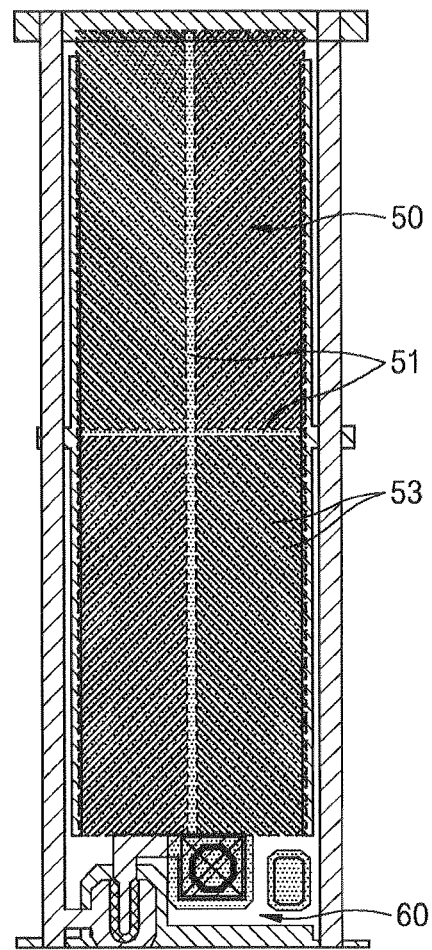
FIG. 4 is a schematic view illustrating an exemplary pixel electrode that may be used as a third electrode of the liquid crystal display device of the embodiment of the present invention.

FIG. 4 is a schematic view illustrating an exemplary pixel electrode that may be used as the third electrode 43 of the liquid crystal display device according to the embodiment of the present invention.

Referring to FIG. 4, a single pixel electrode 50 may be disposed in a pixel region, and a switch driving unit 60 may be disposed on a side of the pixel region. The pixel electrode 50 may be a pattern electrode including a central cross pattern electrode 51 and a plurality of fine branch electrodes 53 extending from the cross pattern electrode 51 in diagonal directions.

When the pixel electrode 50 has a one pixel structure as described above, the size of a region in which the switch driving unit 60 is disposed may be reduced to improve the aperture ratio of a pixel and thus the transmittance of the liquid crystal display device.

A pixel region of a general liquid crystal display device includes two sub-pixel regions and a switch driving unit disposed between the sub-pixel regions. A relatively high pixel voltage is applied to one of the sub-pixel regions, and a relatively low pixel voltage is applied to the other of the sub-pixel regions for ensuring visibility. However, in the structure in which a pixel region is divided into two sub-pixel regions and a switch driving unit is disposed between the two sub-pixel regions, although visibility is ensured, the aperture ratio of the pixel region is low due to a relative large region in which the switch driving unit is disposed, and thus it is difficult to obtain a degree of transmittance necessary for a high-resolution panel.

In the liquid crystal display device of the embodiment of the present invention, however, the third electrode 43 (the pixel electrode 50) has a one pixel structure, and thus the switch driving unit 60 occupies a smaller area, thereby improving an aperture ratio and transmittance. In addition, the liquid crystal layer 20 is divided into the plurality of sub-liquid crystal layers 21 and 25, and different effective voltages are applied to the plurality of sub-liquid crystal layers 21 and 25. Therefore, the plurality of sub-liquid crystal layers 21 and 25 may have different polar angle distributions, and thus side visibility may be guaranteed although the pixel electrode 50 has a one pixel structure.

In the example in which the liquid crystal layer 20 is divided into the first sub-liquid crystal layer 21 and the second sub-liquid crystal layer 25, when a common voltage is applied to the first electrode 41 and a particular voltage (about 2 V or low) is applied to the second electrode 45, the polar angle of the liquid crystal may be variously distributed, and thus side visibility may be improved.

Figure 5:
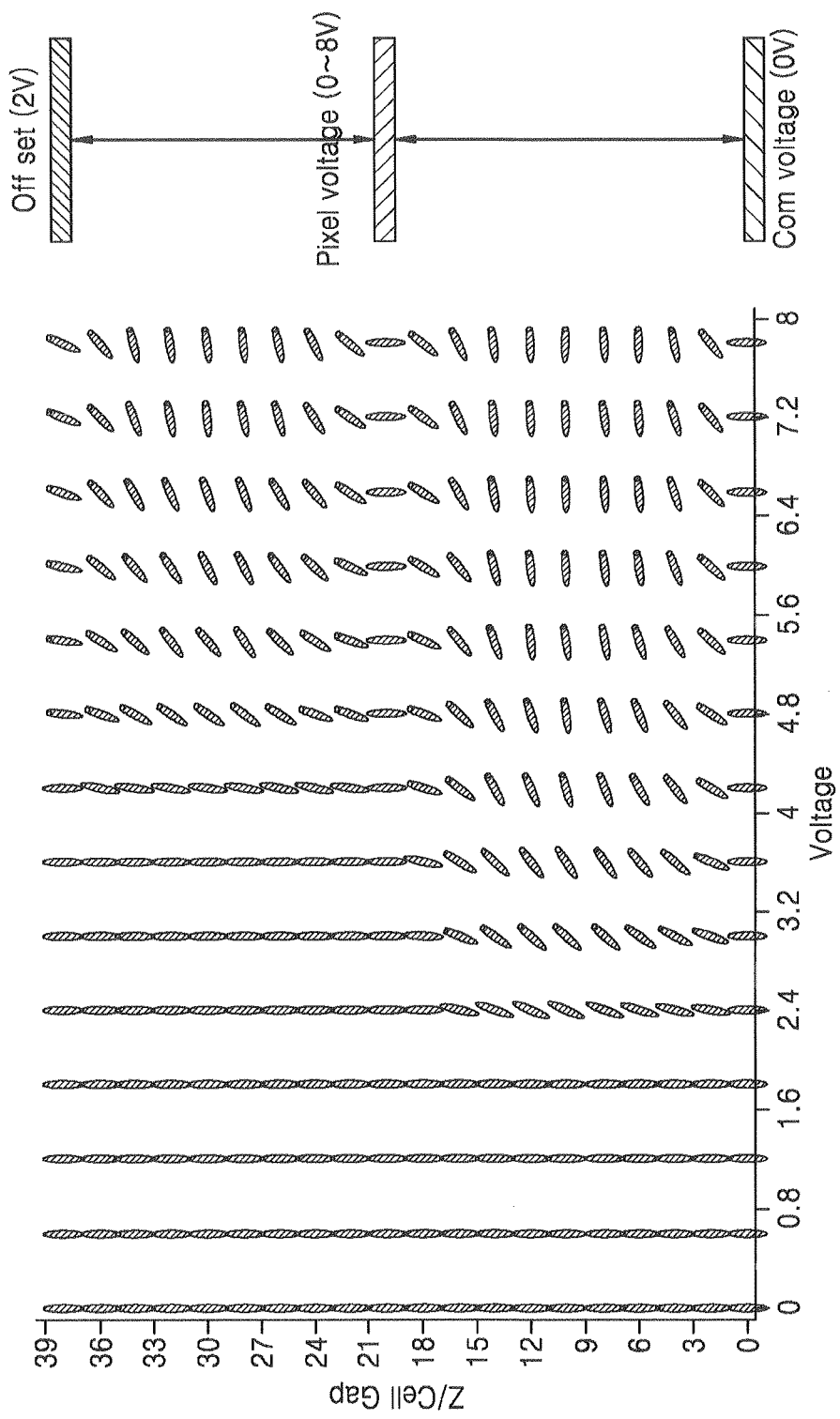
FIG. 5 is a view illustrating a liquid crystal arrangement in the liquid crystal display device of the embodiment with respect to a pixel voltage when a cell gap of a liquid crystal layer of the liquid crystal display device is divided into two parts, the pixel voltage varying from about 0 V to about 8 V in a state where a common voltage is about 0 V and a particular voltage (Off set voltage) is about 2 V.
Figure 6:
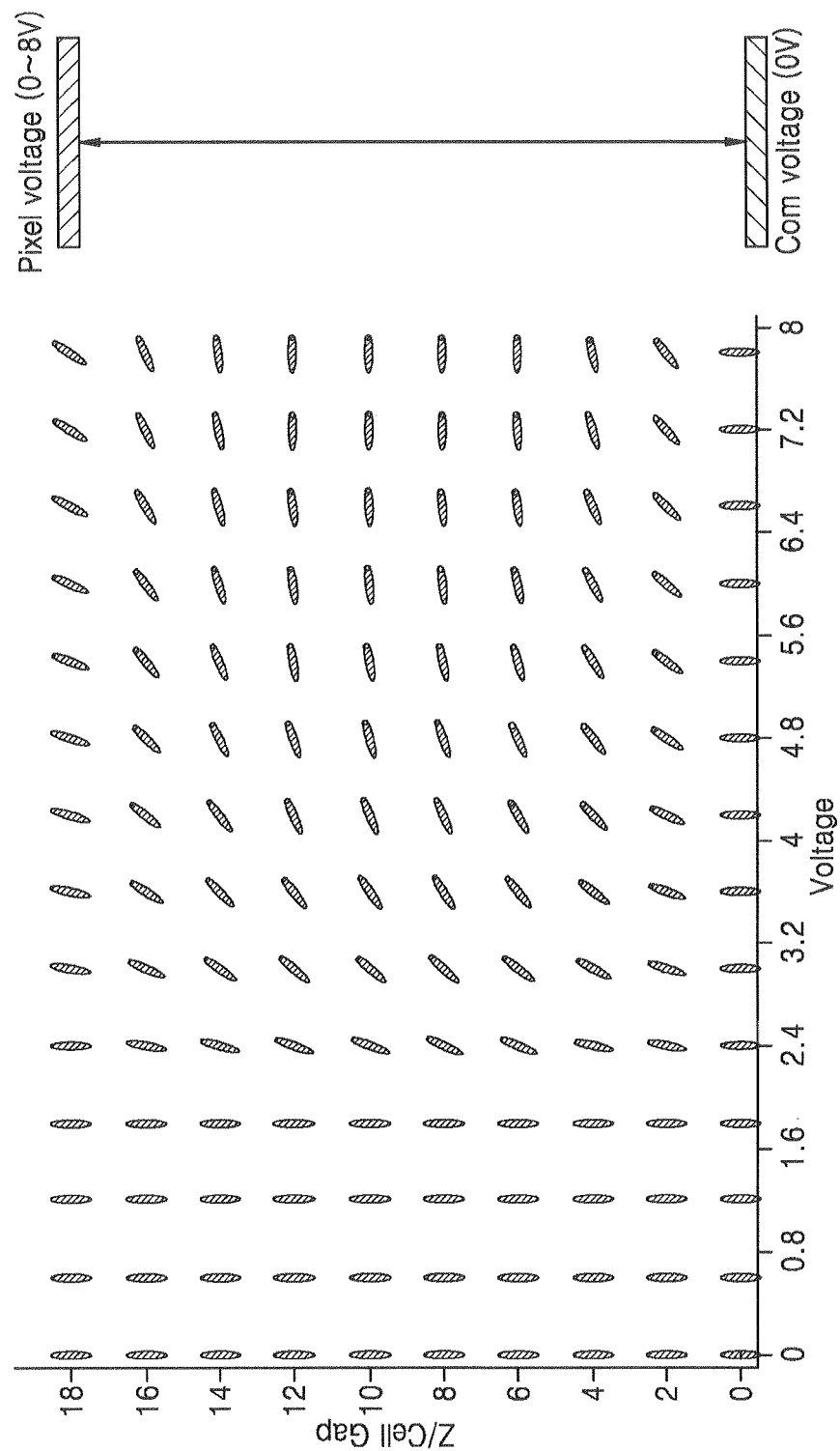
FIG. 6 is a view illustrating a liquid crystal arrangement in a comparative example with respect to a pixel voltage when a cell gap of a liquid crystal layer is not divided.

FIG. 5 is a view illustrating an arrangement of liquid crystal in the liquid crystal display device with respect to a pixel voltage when the cell gap of the liquid crystal layer 20 is divided into two parts according to the embodiment of the present invention. FIG. 6 illustrates an arrangement of liquid crystal with respect to a pixel voltage when a liquid crystal layer is not divided according to a comparative example. In a state in which a common voltage is about 0 V and a particular voltage (Off set) is about 2 V, the pixel voltage ranges from about 0 V to 8 V.

As shown in FIG. 5 and the comparative example of FIG. 6, since different effective voltages are applied to the plurality of sub-liquid crystal layers 21 and 25 of the liquid crystal display device of the embodiment of the present invention, the polar angle of the liquid crystal is variously distributed, and thus side visibility may be guaranteed even though the pixel electrode has a one pixel structure.

As described above, in the liquid crystal display device of the embodiment of the present invention, the liquid crystal layer is divided into a plurality of sub-liquid crystal layers in the cell gap direction, and different effective voltages are applied to the sub-liquid crystal layers. Therefore, the polar angle of the liquid crystal may variously be distributed to ensure side visibility. In addition, since the liquid crystal layer is divided into the plurality of sub-liquid crystal layers, the value Δn*d may be maintained for controlling transmittance, and an effective cell gap may be reduced to obtain a high response speed. Furthermore, since side visibility is guaranteed by applying different effective voltages to the sub-liquid crystal layers, a structure having a single pixel region may be formed without having to form a structure having a plurality of sub-pixel regions to obtaining side visibility. Therefore, an aperture ratio may be improved, and a high degree of transmittance necessary for a high-resolution panel may be obtained.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A liquid crystal display device, comprising:
  a first substrate and a second substrate;
  a first electrode and a second electrode respectively formed on inner surfaces of the first and second substrates that face each other, a cell gap formed between the inner surfaces of the first and second substrates;
  a liquid crystal layer disposed between the first and second electrodes, major axes of molecules of the liquid crystal layer being aligned parallel to a direction of the cell gap in the absence of voltage, the molecules of the liquid crystal layer having a negative dielectric anisotropy; and
  at least one third electrode formed in the liquid crystal layer to divide the liquid crystal layer into a plurality of sub-liquid crystal layers in the direction of the cell gap, wherein the third electrode is a pixel electrode, and the pixel electrode comprises:
  a central cross pattern electrode; and
  a plurality of fine branch electrodes extending from the cross pattern electrode in diagonal directions.

2. The liquid crystal display device of claim 1, wherein the plurality of sub-liquid crystal layers comprise a first sub-liquid crystal layer and a second sub-liquid crystal layer, and the third electrode is disposed between the first and second sub-liquid crystal layers.

3. The liquid crystal display device of claim 1, wherein different effective voltages are applied to the plurality of sub-liquid crystal layers respectively.

4. The liquid crystal display device of claim 3, wherein the plurality of sub-liquid crystal layers comprise a first sub-liquid crystal layer and a second sub-liquid crystal layer, and the third electrode is disposed between the first and second sub-liquid crystal layers.

5. The liquid crystal display device of claim 1, wherein a common voltage is applied to one of the first and second electrodes, and a particular voltage different from the common voltage is applied to the other of the first and second electrodes for applying different effective voltages to the plurality of sub-liquid crystal layers.

6. The liquid crystal display device of claim 5, wherein the plurality of sub-liquid crystal layers comprise a first sub-liquid crystal layer and a second sub-liquid crystal layer, and the third electrode is disposed between the first and second sub-liquid crystal layers.

7. The liquid crystal display device of claim 5, wherein the particular voltage is about 2 V or lower.

8. The liquid crystal display device of claim 1, wherein the pixel electrode has a one pixel structure.

9. The liquid crystal display device of claim 1, wherein the plurality of sub-liquid crystal layers comprise a first sub-liquid crystal layer and a second sub-liquid crystal layer, and the third electrode is disposed between the first and second sub-liquid crystal layers.

10. The liquid crystal display device of claim 1, wherein the liquid crystal layer is divided into the plurality of sub-liquid crystal layers within a range in which an effective refractive index of the liquid crystal layer is maintained.

11. The liquid crystal display device of claim 1, wherein the plurality of sub-liquid crystal layers are formed of the same liquid crystal.

12. The liquid crystal display device of claim 1, further comprising a support member disposed in the liquid crystal layer to support the third electrode.

13. The liquid crystal display device of claim 1, wherein different effective voltages are applied to the plurality of sub-liquid crystal layers respectively.

* * * * *